US010791801B2

(12) United States Patent
Lambarth et al.

(10) Patent No.: US 10,791,801 B2
(45) Date of Patent: Oct. 6, 2020

(54) SEAT BELT BUCKLE RELEASE ASSIST DEVICE

(71) Applicant: CSL Solutions, LLC, Portage, MI (US)

(72) Inventors: Clifford E. Lambarth, Portage, MI (US); Shaelie Jacquie Lambarth, Portage, MI (US)

(73) Assignee: CSL Solutions, LLC, Portage, MI (US)

( * ) Notice: Subject to any disclaimer, the term of this patent is extended or adjusted under 35 U.S.C. 154(b) by 181 days.

(21) Appl. No.: 15/572,672

(22) PCT Filed: May 9, 2016

(86) PCT No.: PCT/US2016/031485

§ 371 (c)(1),
(2) Date: Nov. 8, 2017

(87) PCT Pub. No.: WO2016/195923

PCT Pub. Date: Dec. 8, 2016

(65) Prior Publication Data

US 2018/0132571 A1 May 17, 2018

Related U.S. Application Data

(60) Provisional application No. 62/169,038, filed on Jun. 1, 2015.

(51) Int. Cl.
*A44B 11/25* (2006.01)
*B60R 22/32* (2006.01)
(Continued)

(52) U.S. Cl.
CPC ...... *A44B 11/2526* (2013.01); *A44B 11/2507* (2013.01); *B25B 27/0035* (2013.01);
(Continued)

(58) Field of Classification Search
CPC ........... A44B 11/2526; A44B 11/2507; A44B 11/2511; B25B 27/0035; B25B 13/48;
(Continued)

(56) References Cited

U.S. PATENT DOCUMENTS 2,594,684 A * 4/1952 Rothe ....................... B25B 7/02 81/186
2,685,810 A * 8/1954 Wolbaum ................ B25B 13/14 81/356

(Continued)

OTHER PUBLICATIONS

International Search Report dated Oct. 4, 2016, for International application No. PCT/US2016/031485.

(Continued)

*Primary Examiner* — Robert J Scruggs
(74) *Attorney, Agent, or Firm* — Warner Norcross + Judd LLP

(57) ABSTRACT

An independent buckle release assist device that is a shaped lever that allows a user to gain mechanical advantage to release a typical seat belt release button. The device uses the seat restraint as a leverage point to create the mechanical advantage required to reduce the force of actuating the button. The release assist device is also designed to both stay mounted at least partially around the seat restraint and to be removably mounted to the seat restraint.

8 Claims, 9 Drawing Sheets

3
2a
2
1
2b

(51) Int. Cl.
*B25B 27/00* (2006.01)
*B25G 1/10* (2006.01)
*B60R 22/18* (2006.01)

(52) U.S. Cl.
CPC .............. *B25G 1/102* (2013.01); *B60R 22/32* (2013.01); *A44B 11/2511* (2013.01); *B60R 2022/1806* (2013.01)

(58) Field of Classification Search
CPC ... B25B 13/481; B25B 13/5091; B25B 17/00; B25G 1/102; B60R 22/32; B60R 2022/1806; E21B 19/16
See application file for complete search history.

(56) References Cited

U.S. PATENT DOCUMENTS

| | | | | |
|---|---|---|---|---|
| 3,760,467 | A | 9/1973 | Lohr | |
| 4,300,789 | A | 11/1981 | Matsuoka et al. | |
| 6,959,952 | B2 * | 11/2005 | Williams | B66C 1/62 294/103.1 |
| 6,988,297 | B2 | 1/2006 | Willard et al. | |
| 7,104,166 | B1 * | 9/2006 | Wong | B25B 5/12 81/180.1 |
| 7,908,942 | B1 * | 3/2011 | Mitchell | B67B 7/20 81/3.55 |
| 8,677,577 | B2 * | 3/2014 | McGlynn | A44B 11/2576 24/198 |
| 8,869,407 | B2 * | 10/2014 | Votolato | B67B 7/30 30/294 |
| 2002/0112327 | A1 | 8/2002 | Baloga | |
| 2007/0193005 | A1 | 8/2007 | Chalk | |
| 2011/0308057 | A1 * | 12/2011 | Abrams | B25B 7/02 29/426.5 |
| 2013/0239760 | A1 | 9/2013 | Lucas | |

OTHER PUBLICATIONS

International Written Opinion dated Oct. 4, 2016, for International application No. PCT/US2016/031485.

* cited by examiner 3a
2
2c
2a
1c
2b
3
1b
1a
1d
1

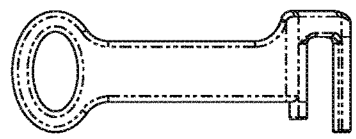
FIGURE 17
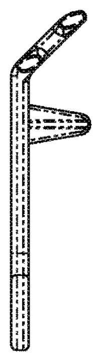
FIGURE 18
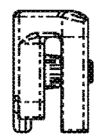
FIGURE 19
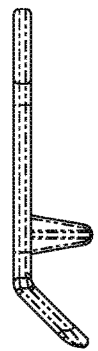
FIGURE 20
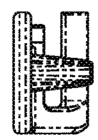
FIGURE 21
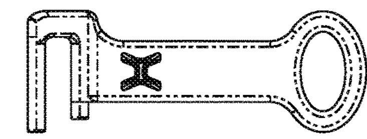
FIGURE 22
FIGURE 23
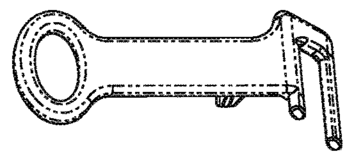
FIGURE 24
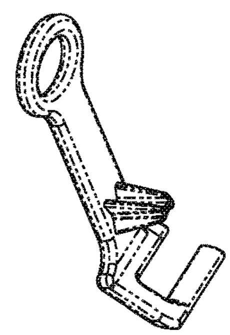
FIGURE 25

SEAT BELT BUCKLE RELEASE ASSIST DEVICE

CROSS-REFERENCE TO RELATED APPLICATION

This application is a 371 of International application No. PCT/US2016/031485 filed May 9, 2016 entitled SEAT BELT BUCKLE RELEASE ASSIST DEVICE, which claims the benefit of U.S. Provisional Patent Application No. 62/169,038, filed Jun. 1, 2015, which is incorporated herein by reference in its entirety and commonly owned by CSL Solutions, LLC, Portage, Mich.

FIELD OF THE INVENTION

The present invention relates to a lever for assisting release of a seat belt buckle.

SUMMARY OF THE INVENTION

An independent buckle release assist device is provided for use with a seat restraint including a belt with a buckle and a release button. The assist device includes a rigid projection lever having a distal end; a structural tip configured to contact a release button of the buckle, the structural tip having a distance to the distal end; and a loop configured to at least partially extend around the seat restraint to a side opposite the release button, the loop having a distance to the structural tip. The distance between the distal end of the projection lever and the loop is greater than the distance between the loop and the structural tip.

In one aspect, the loop includes a slot such that the assist device may be removably mounted to a seat restraint.

In another aspect, the rigid projection lever includes a rubberized surface to provide additional grip for a user and the structural tip includes a rubberized surface to provide additional friction for actuating the release button.

According to another aspect, the independent buckle release assist device includes a releasable fastener configured to releasably mount to the buckle release assist device. The releasable fastener includes a bolt, pin, clevis pin, or other fastener, and the releasable fastener creates a loop for providing a temporary attachment to the seat restraint.

Before the various embodiments are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF DRAWINGS

FIG. 4A is a rear perspective view of a seat restraint and a buckle release assist device, according to a second embodiment;

FIG. 17 is a front view of the assist device of FIG. 4A;

FIG. 18 is a side view of the assist device of FIG. 4A;

FIG. 19 is a bottom view of the assist device of FIG. 4A;

FIG. 20 is a side view of the assist device of FIG. 4A;

FIG. 21 is a top view of the assist device of FIG. 4A;

FIG. 22 is a rear view of the assist device of FIG. 4A;

FIG. 23 is a rear perspective view of the assist device of FIG. 4A;

FIG. 24 is a front perspective view of the assist device of FIG. 4A;

FIG. 25 is a bottom perspective view of the assist device of FIG. 4A.

DETAILED DESCRIPTION OF THE EMBODIMENTS

Figure 1:
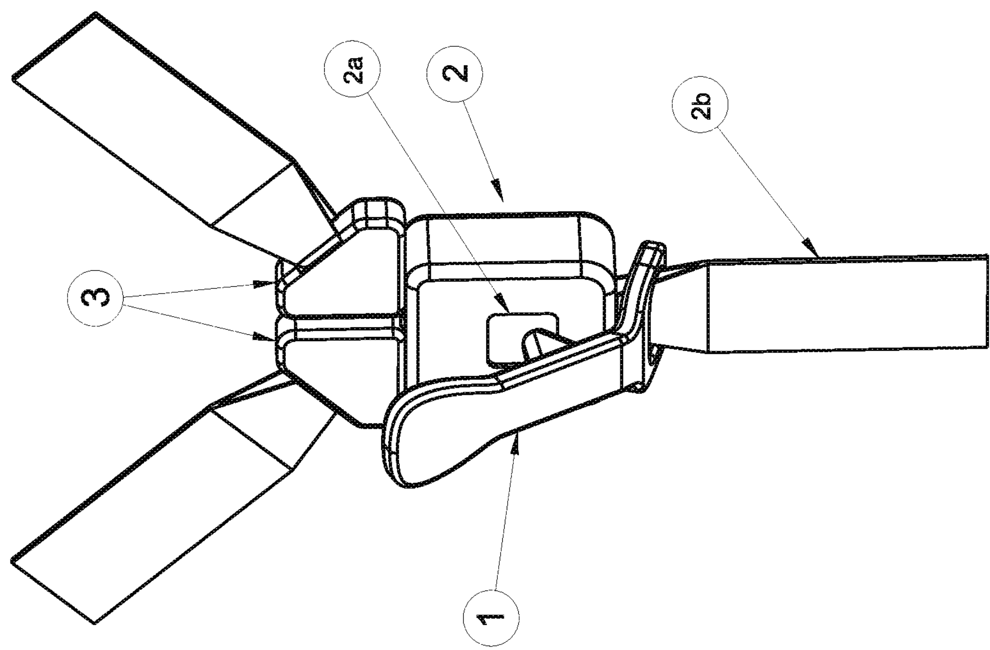
FIG. 1 is a front perspective view of a seat restraint and a buckle release assist device, according to one embodiment.
Figure 2:
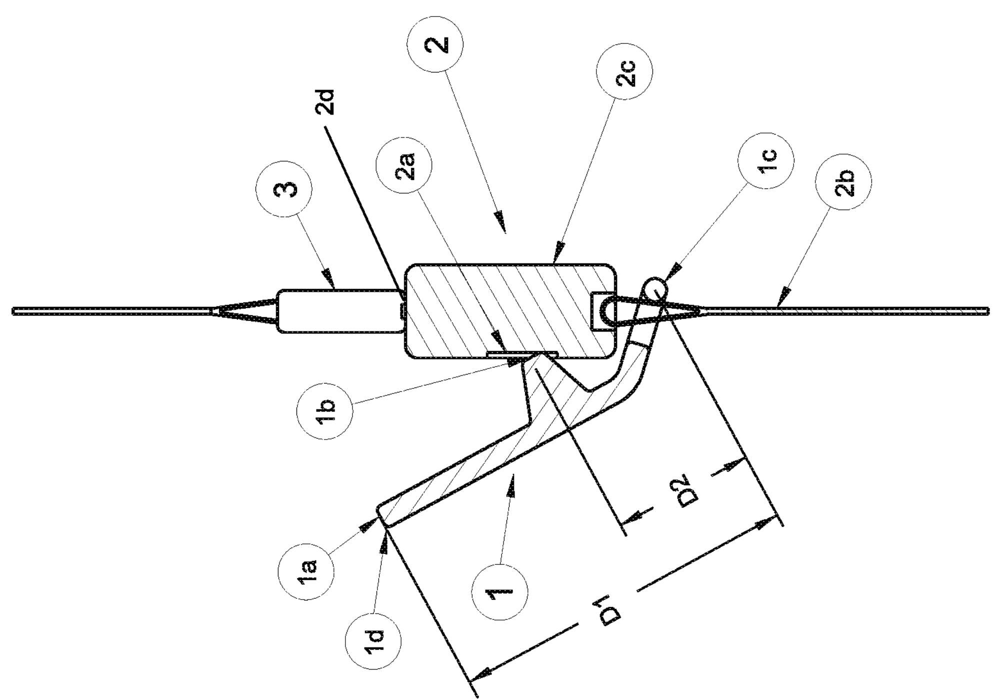
FIG. 2 is a cross-sectional side view of the seat restraint and buckle release assist device of FIG. 1, illustrating an initial, mounted position.
Figure 3:
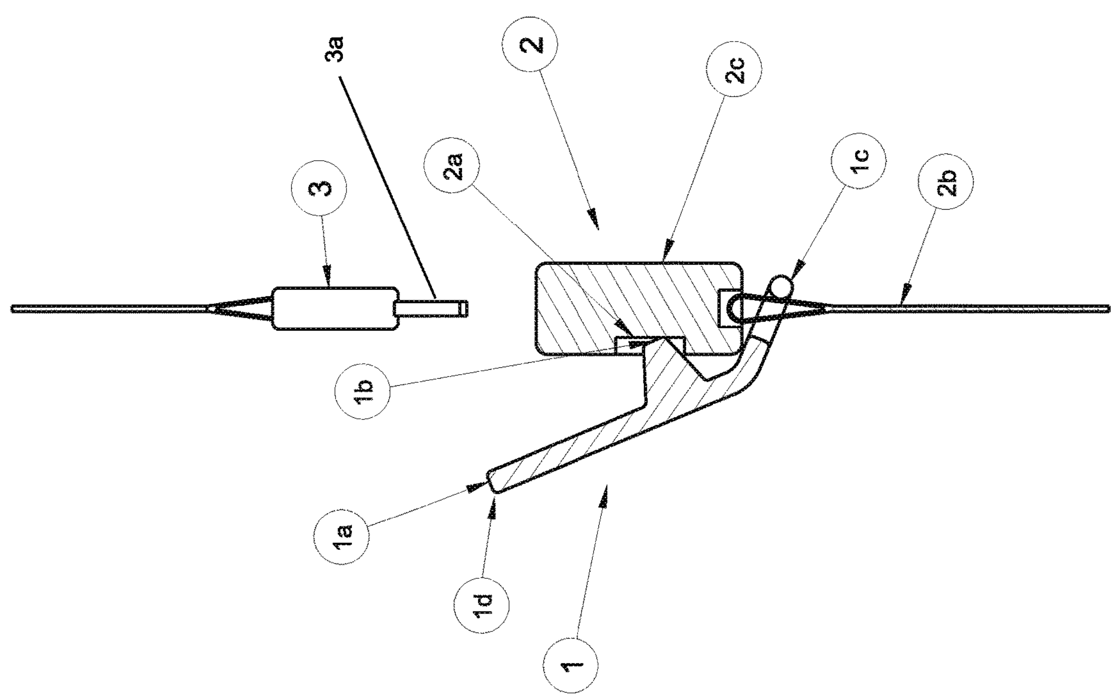
FIG. 3 is a cross-sectional side view of the seat restraint and buckle release assist device of FIG. 1, illustrating a tip of the assist device depressing a release button.
Figure 4:
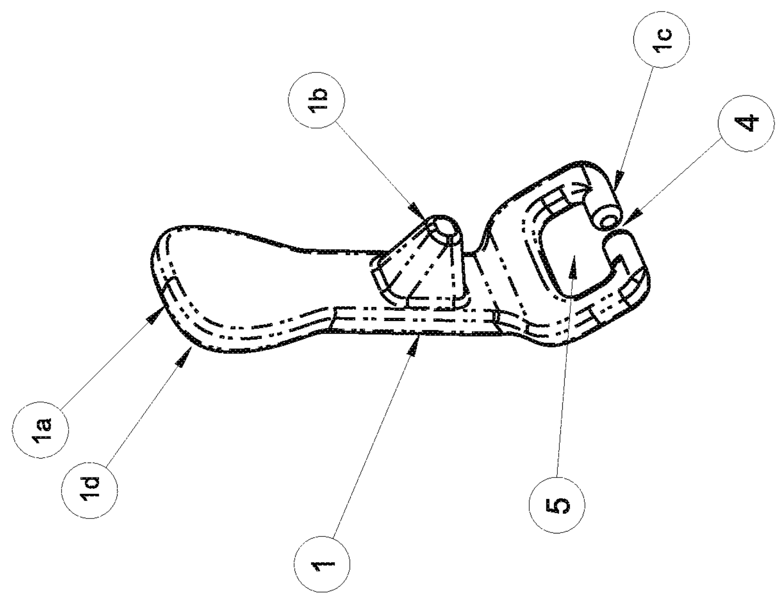
FIG. 4 is a rear perspective view of the assist device of FIG. 1.

An independent buckle release assist device is a lever that enables a user to gain mechanical advantage to release a common seat belt release button. The assist device uses the seat restraint when in tension as a leverage point to create the mechanical advantage required to reduce the force a user must exert to actuate the release button. The assist device is also designed to either stay mounted at least partially around the seat restraint or to be selectively removable. These aspects of the assist device can be advantageous for children or anyone that does not have the strength to depress the release button.

Referring to FIGS. 1-4 and 8-16, the numeral 1 generally designates a buckle release assist device for use with a seat restraint. The seat restraint may be a conventional five point harness commonly used on infant and child car seats. The seat restraint 2 includes a belt 2*b* with a buckle 2*c* and a release button 2*a*. The assist device 1 is a unitary, namely a one piece or monolithic member having several portions, including a projection lever 1*a*, a tip 1*b*, and a loop 1*c*. The projection lever 1*a* is a rigid member that has a distal end 1*d*.

In addition, the projection lever 1*a* may include a rubberized surface or layer to provide additional grip for a user.

The tip 1*b* is a structural member that protrudes from the projection lever 1*a*. In the illustrated example, the tip 1*b* is shown protruding from the projection lever 1*a;* it should be easily understood by one skilled in the art that tip 1*b* could protrude from the loop 1*c*. In the illustrated example, the tip 1*b* is shown as having a pyramid or cone shape; it should be easily understood by one skilled in the art that other protruding shapes are also contemplated. The tip 1*b* is configured to contact the release button 2*a* of the buckle 2*c*. The tip 1*b* has a distance D2 to the loop 1*c*. Further, the tip 1*b* may include a rubberized surface or layer to provide additional friction for actuating the release button 2*a*.

The loop 1*c* is disposed opposite the distal end 1*d* of the projection lever 1*a*. The loop 1*c* includes a slot 4 and an opening 5. The loop 1*c* is configured for removably mounting to the seat restraint 2 and extends around the seat restraint 2 to a side opposite the release button 2*a*. To mount the loop 1*c* to the belt 2*b,* the belt 2*b* is inserted through the slot 4 and extends through the opening 5. Further, the loop 1*c* has a distance D1 to the projection lever 1*a*.

According to one aspect of the assist device 1, the distance D1 between the distal end 1*d* of the projection lever 1*a* and the loop 1*c* is greater than the distance D2 between the loop 1*c* and the tip 1*b*. This distance relationship provides proper leverage to reduce the applied force required to actuate the release button 2*a* of the buckle 2*c*.

FIG. 4A shows another embodiment of an assist device 51 with a variation to the loop and slot design. The loop 51*c* is disposed opposite the distal end 51*d* of the projection lever 51*a*. The loop 51*c* includes a slot 54 and an opening 55. The loop 51*c* is configured for removably mounting to the seat restraint 2 and extends around the seat restraint 2 to a side opposite the release button 2*a*. To mount the loop 51*c* to the belt 2*b,* the belt 2*b* is inserted through the slot 54 and extends into the opening 55.

Figure 5:
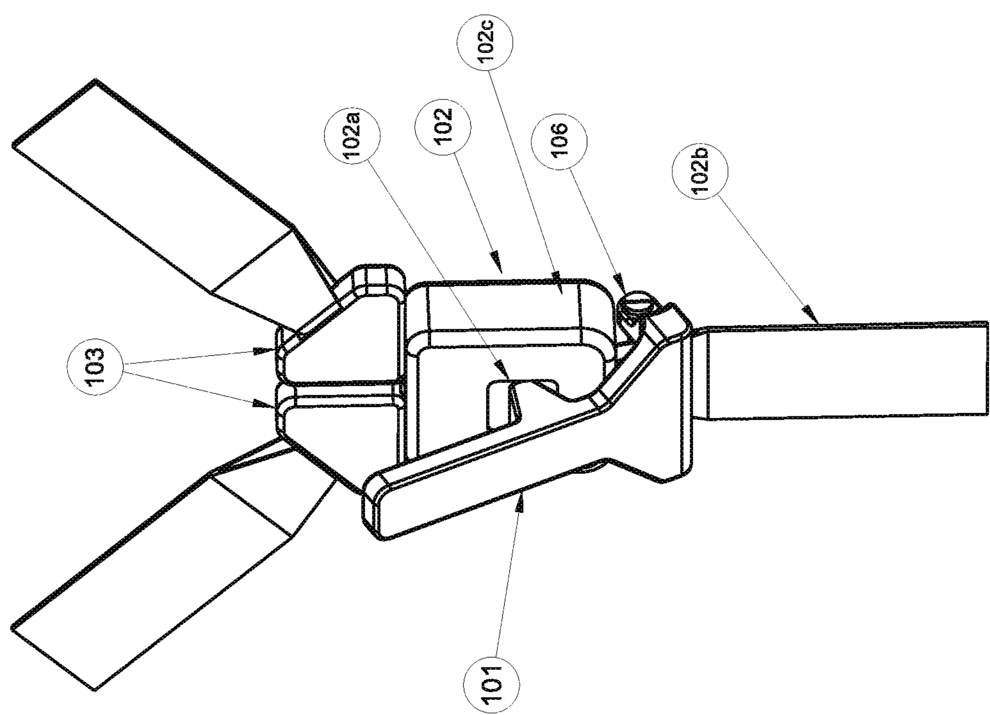
FIG. 5 is a front perspective view of a seat restraint and a buckle release assist device, according to a third embodiment.
Figure 6:
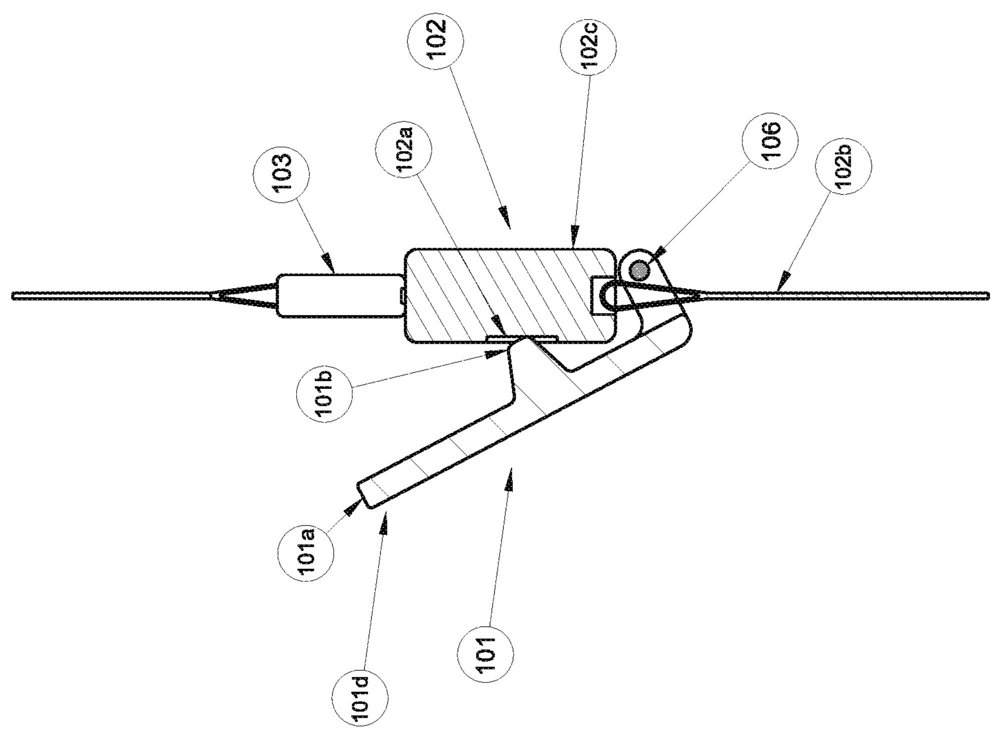
FIG. 6 is a cross-sectional side view of the seat restraint and buckle release assist device of FIG. 5, illustrating an initial, mounted position.
Figure 7:
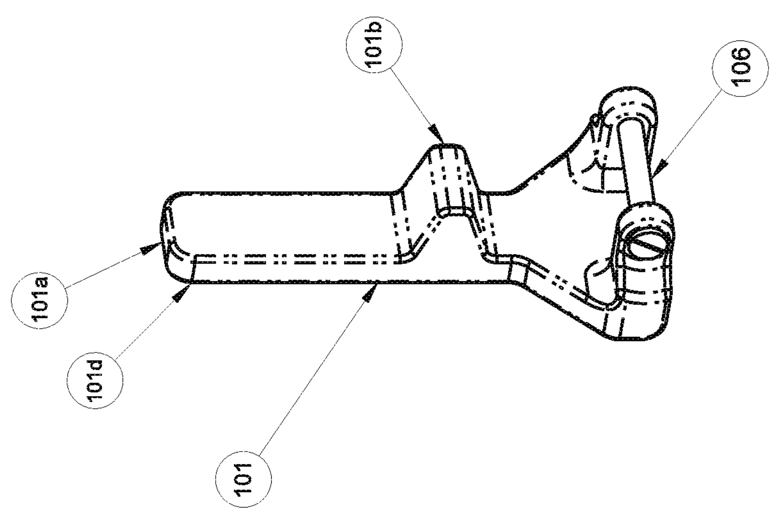
FIG. 7 is a rear perspective view of the assist device of FIG. 5.
Figure 8:
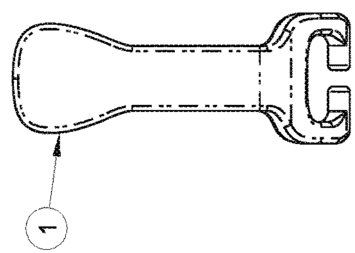
FIG. 8 is a front view of the assist device of FIG. 1.
Figure 9:
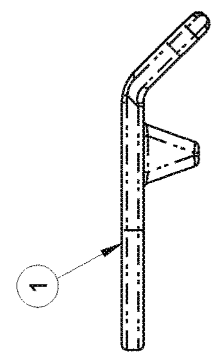
FIG. 9 is a side view of the assist device of FIG. 1.
Figure 10:
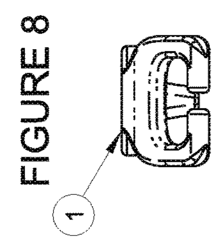
FIG. 10 is a bottom view of the assist device of FIG. 1.
Figure 11:
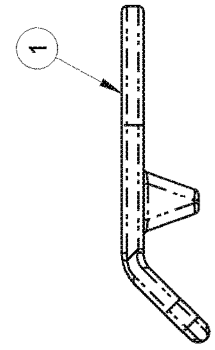
FIG. 11 is a side view of the assist device of FIG. 1.
Figure 12:
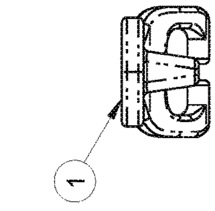
FIG. 12 is a top view of the assist device of FIG. 1.
Figure 13:
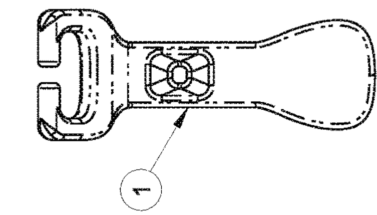
FIG. 13 is a rear view of the assist device of FIG. 1.
Figure 14:
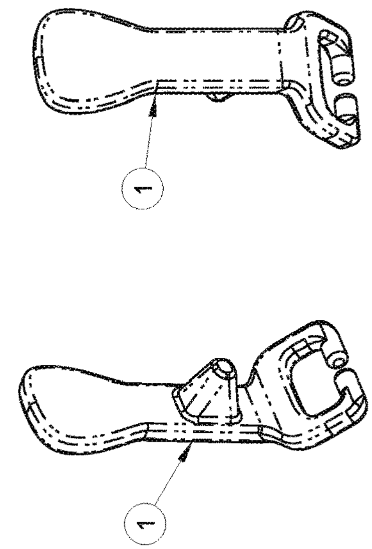
FIG. 14 is a rear perspective view of the assist device of FIG. 1.
Figure 15:
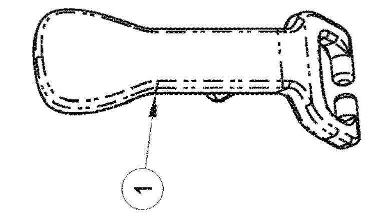
FIG. 15 is a front perspective view of the assist device of FIG. 1.
Figure 16:
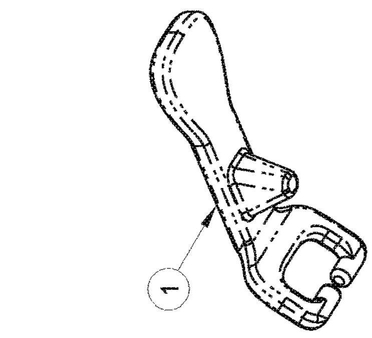
FIG. 16 is a bottom perspective view of the assist device of FIG. 1.

Referring to FIGS. 5-7, a second embodiment of the assist device is illustrated. Assist device 101 similarly includes a projection lever 101*a,* a tip 101*b,* and a pin 106. Alternatively, the pin 106 may include a bolt, clevis pin, or other suitable fastener.

To operate the assist device 1, the loop 1*c* is mounted to the seat restraint 2, below the buckle 2*c*. To mount the loop lc to the belt 2*b*, the belt 2*b* is passed through the slot 4 and into the opening 5. The assist device 1 can then be positioned such that the tip 1*b* is adjacent the release button 2*a*, with the projection lever la extending there above, defining an initial, mounted position. To actuate the release button 2*a* and release a tab 3*a* of latch 3 from the latch portion 2*d* of buckle 2, a user may press the distal end ld of the projection lever 1*a* toward the buckle 2*c*. The aligned tip 1*b* depresses the release button 2*a* until the latch 3 is released from latch portion 2*d* of buckle 2. The cantilevered motion or pivot of the assist device, about the loop as mounted to the seat restraint 2, decreases the amount of force required of a user to exert to depress the release button 2*a* and release the tab 3*a* of latch 3 from the buckle 2*c*. The assist device 1 may remain mounted at least partially around the belt 2*b*, or may be removed after use. The assist device 101 is mounted and operated in a substantially similar fashion.

While several forms of the inventions have been shown and described, the above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert but which can be used independently and/ or combined with other features. The present invention is not limited to only those embodiments that include all of these features or that provide all of the stated benefits, except to the extent otherwise expressly set forth in the issued claims. For example, any reference to claim elements in the singular, for example, using the articles "a," "an," "the" or "said," is not to be construed as limiting the element to the singular. Additionally, directional terms used in the specification, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

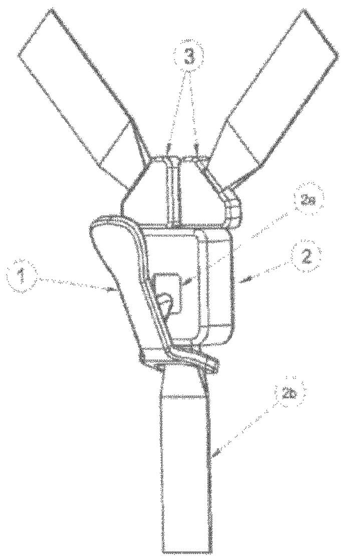

We claim:

1. An independent buckle release assist device for use with a seat restraint, the seat restraint including a belt with a buckle and a release button, the buckle having a latch portion for receiving a latch, the belt having a length and opposed edges, the assist device comprising:

a base having a receiving portion for being placed around at least a portion of the belt of the seat restraint adjacent the buckle but opposed from the latch portion, said receiving portion having an opening and a slot in communication with said opening, said slot for receiving the belt there though for receipt in said opening to thereby releasably couple said release assist device to the seat restraint, said receiving portion configured to capture both opposed edges of the belt of the seat restraint therebetween in said opening to facilitate retention of the base on the belt once the belt is inserted though said slot and into said opening of the receiving portion but remain removable from the belt without release of the latch from the buckle;

a lever extending from said base, said lever and said base being a monolithic member, said lever having a distal end, an inwardly facing side and an outwardly facing side, said inwardly facing side for facing the buckle when the assist device is coupled to the seat restraint;

said lever having a monolithic projecting tip at said inwardly facing side configured to contact the release button of the buckle when the assist device is mounted adjacent the buckle; and when coupled to the seat restraint said base positioning the tip of the lever over the release button wherein when the lever is pressed toward the release button the tip is operable to actuate the release button.

2. The assist device of claim 1, wherein said receiving portion comprises a loop, said loop including said slot and said opening for receiving the belt into said receiving portion.

3. The assist device of claim 1, wherein the lever includes a rubberized surface to provide additional grip for a user.

4. The assist device of claim 1, wherein the tip includes a rubberized surface to provide additional friction for actuating the release button.

5. The independent assist device of claim 1 in combination with the seat restraint.

6. A method of depressing a release button on a vehicle seat restraint using an independent buckle release assist device, the seat restraint having a belt, a latch, and a buckle with the release button, the buckle having a latch portion for receiving the latch, the belt having a portion adjacent the buckle but opposed from the latch portion, and the buckle assist device having a monolithic member with a base and a lever, the base having a receiving portion with an opening and a slot in communication with the opening and being configured to releasably mount the release assist device to the belt of the seat restraint, the lever including a tip, the method including:

inserting the portion of the belt adjacent the buckle into the opening of the base of the buckle release assist device through the slot thereby releasably coupling the assist device to the portion of the belt adjacent the buckle of the seat restraint wherein the assist device may be coupled to and uncoupled from the seat restraint when the latch is received in the latch portion of the buckle;

said releasably coupling includes capturing both opposed edges of the belt in the assist device;

positioning the tip of the buckle release assist device adjacent the release button of the buckle; and pressing the lever toward the release button of the buckle until the latch is released from the buckle.

7. The method of claim 6, wherein the releasably coupling includes coupling the assist device by capturing the opposed edges of the belt between two opposed sides of a loop, the loop forming the opening and the slot.

8. The method of claim 6, wherein the releasably coupling includes inserting the belt into the loop through the slot in the loop and locating the slot between the two opposed edges of the belt.

* * * * *

UNITED STATES PATENT AND TRADEMARK OFFICE

CERTIFICATE OF CORRECTION

PATENT NO. : 10,791,801 B2
APPLICATION NO. : 15/572672
DATED : October 6, 2020
INVENTOR(S) : Clifford E. Lambarth and Shaelie Jacquie Lambarth It is certified that error appears in the above-identified patent and that said Letters Patent is hereby corrected as shown below:

On the Title Page

Please replace the title page with the attached title page.

In the Drawings

Please add the following FIG. 4A:

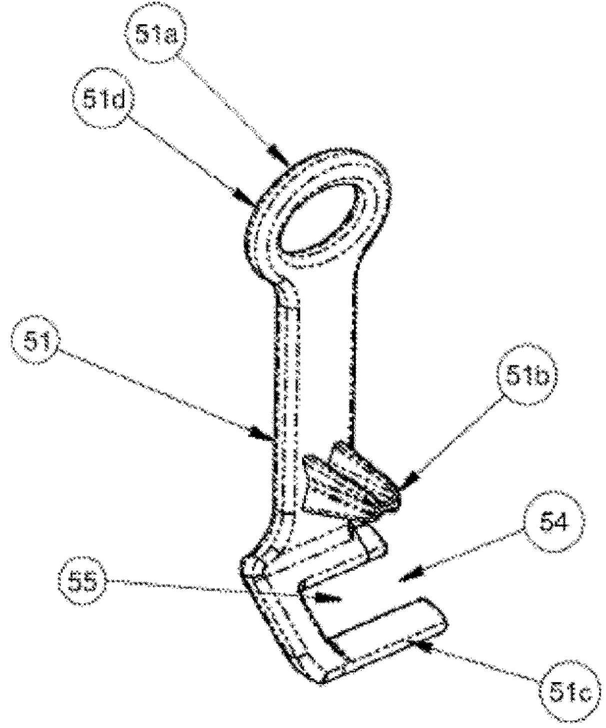

FIGURE 4A

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*

(12) United States Patent
Lambarth et al.

(10) Patent No.: US 10,791,801 B2
(45) Date of Patent: Oct. 6, 2020

(54) SEAT BELT BUCKLE RELEASE ASSIST DEVICE

(71) Applicant: CSL Solutions, LLC, Portage, MI (US)

(72) Inventors: Clifford E. Lambarth, Portage, MI (US); Shaelie Jacquie Lambarth, Portage, MI (US)

(73) Assignee: CSL Solutions, LLC, Portage, MI (US)

( * ) Notice: Subject to any disclaimer, the term of this patent is extended or adjusted under 35 U.S.C. 154(b) by 181 days.

(21) Appl. No.: 15/572,672

(22) PCT Filed: May 9, 2016

(86) PCT No.: PCT/US2016/031485

§ 371 (c)(1),
(2) Date: Nov. 8, 2017

(87) PCT Pub. No.: WO2016/195923

PCT Pub. Date: Dec. 8, 2016

(65) Prior Publication Data

US 2018/0132571 A1 May 17, 2018

Related U.S. Application Data

(60) Provisional application No. 62/169,038, filed on Jun. 1, 2015.

(51) Int. Cl.
*A44B 11/25* (2006.01)
*B60R 22/32* (2006.01)
(Continued)

(52) U.S. Cl.
CPC ...... *A44B 11/2526* (2013.01); *A44B 11/2507* (2013.01); *B25B 27/0035* (2013.01);
(Continued)

(58) Field of Classification Search
CPC ........... A44B 11/2526; A44B 11/2507; A44B 11/2511; B25B 27/0035; B25B 13/48;
(Continued)

(56) References Cited

U.S. PATENT DOCUMENTS 2,594,684 A * 4/1952 Rothe ..................... B25B 7/02 81/186
2,685,810 A * 8/1954 Wolbaum ............. B25B 13/14 81/356
(Continued)

OTHER PUBLICATIONS

International Search Report dated Oct. 4, 2016, for International application No. PCT/US2016/031485.
(Continued)

*Primary Examiner* — Robert J Scruggs
(74) *Attorney, Agent, or Firm* — Warner Norcross + Judd LLP

(57) ABSTRACT

An independent buckle release assist device that is a shaped lever that allows a user to gain mechanical advantage to release a typical seat belt release button. The device uses the seat restraint as a leverage point to create the mechanical advantage required to reduce the force of actuating the button. The release assist device is also designed to both stay mounted at least partially around the seat restraint and to be removably mounted to the seat restraint.

8 Claims, 10 Drawing Sheets